June 21, 1932.  O. F. CARLSON  1,863,590
VALVE
Filed Feb. 15, 1928  8 Sheets-Sheet 4

Inlet Valve

Discharge Valve

Inventor
Oscar F. Carlson
By Brown Jackson Boettcher & Dienner
Atty's

June 21, 1932.   O. F. CARLSON   1,863,590
VALVE
Filed Feb. 15, 1928   8 Sheets-Sheet 5

Discharge Valve

Inlet Valve

Inventor
Oscar F. Carlson
By Brown Jackson Boettcher Dienner
Atty's

June 21, 1932.   O. F. CARLSON   1,863,590
VALVE
Filed Feb. 15, 1928   8 Sheets-Sheet 6

Discharge Valve

Inlet Valve

Inventor
Oscar F. Carlson
By Brown Jackson Boettcher Dienner
Attys

June 21, 1932.  O. F. CARLSON  1,863,590
VALVE
Filed Feb. 15, 1928   8 Sheets-Sheet 7
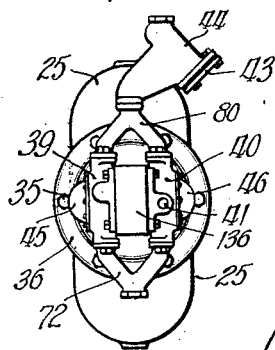
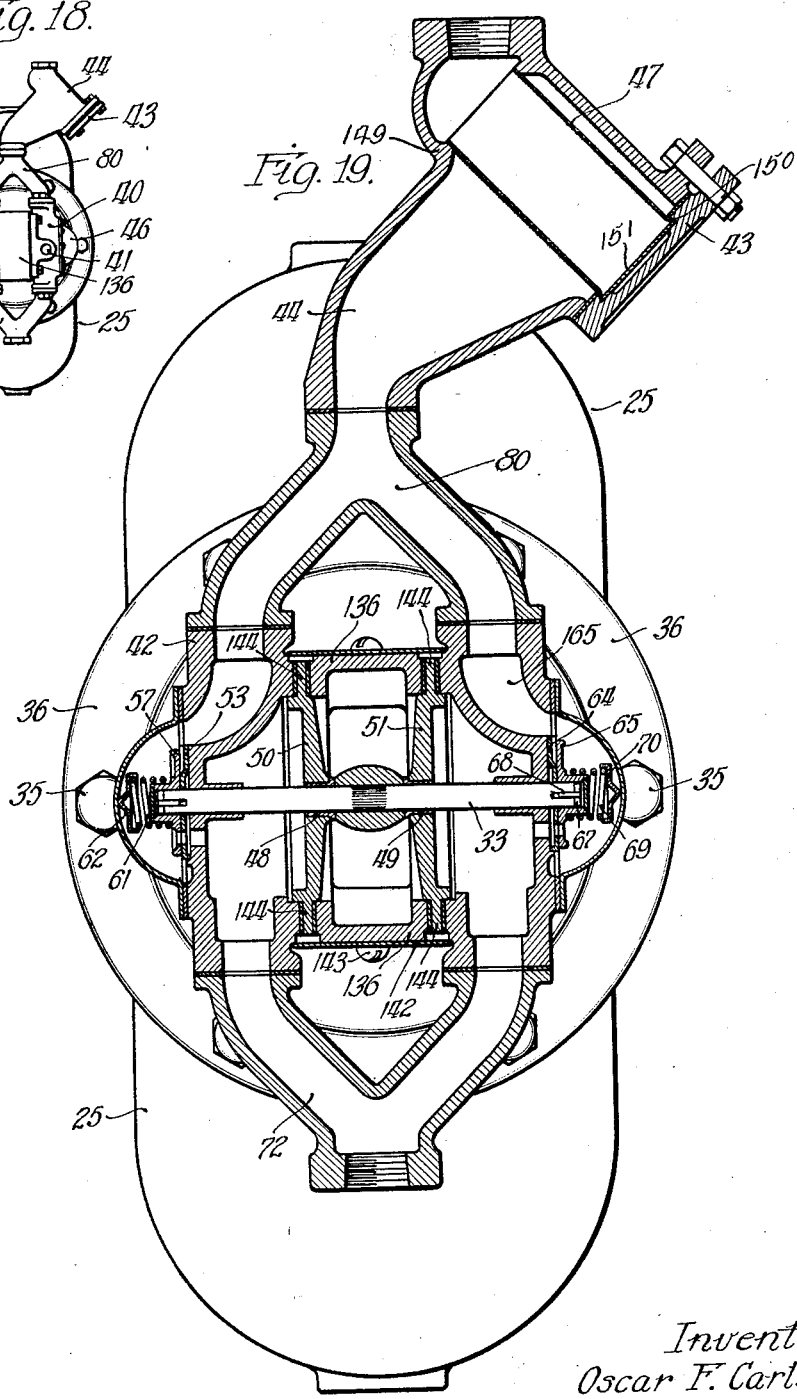
Inventor
Oscar F. Carlson
By Brown Jackson Boettcher Dienner
Atty's.

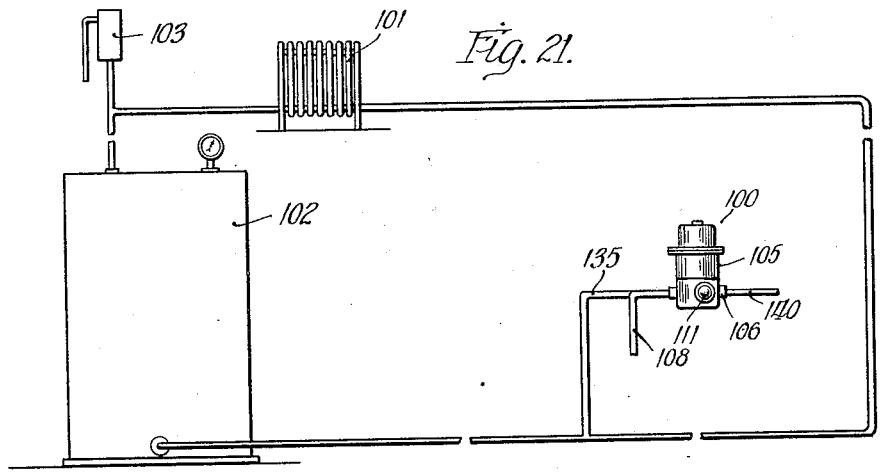
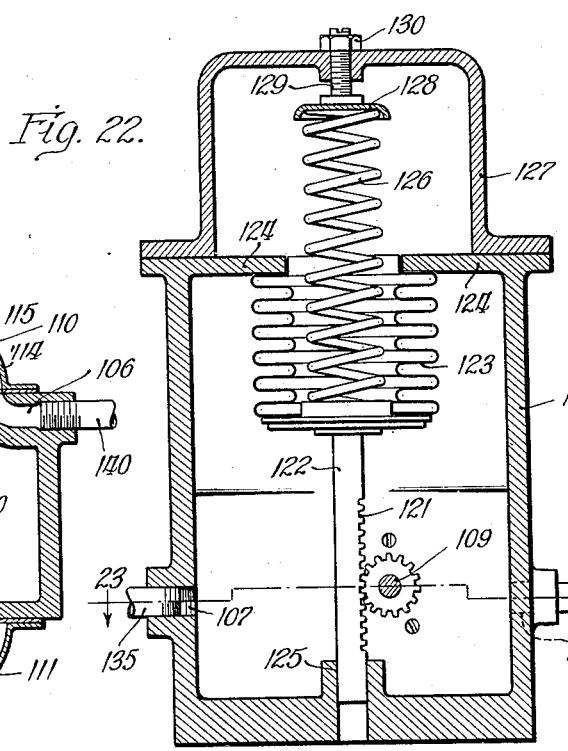
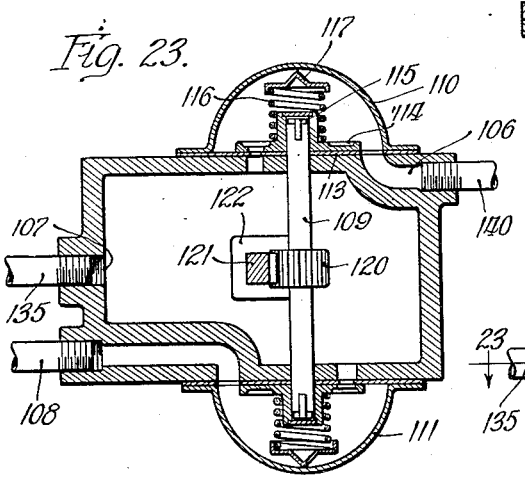
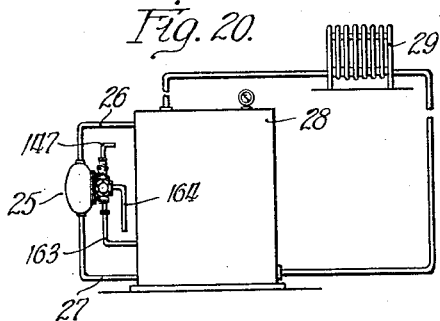
Inventor
Oscar F. Carlson

Patented June 21, 1932

1,863,590

UNITED STATES PATENT OFFICE

OSCAR F. CARLSON, OF CHICAGO, ILLINOIS, ASSIGNOR TO OSCAR F. CARLSON COMPANY, OF CHICAGO, ILLINOIS, A CORPORATION OF ILLINOIS

VALVE

Application filed February 15, 1928. Serial No. 254,345.

My invention relates to valves of the type adapted for automatic actuation by a level responsive element, pressure responsive element or the like.

While the specific use to which I have shown the valve of my invention as applied is the keeping of a predetermined level or head in a heating system, it is to be understood that the valve of my invention has much wider use and is not to be limited to any specific use.

In a steam heating system it is desirable for best results that the level of water in the boiler be maintained within predetermined limits, on the one hand to prevent flooding of the boiler and delivery of wet steam, and also interfering with the predetermined circulation, and on the other hand to prevent burning of the boiler due to inadequate water contents.

Usually when a boiler is started, make-up water is required because of the amount passed up into the radiators in the form of steam. When the demand for heat diminishes more condensed steam runs back into the boiler and tends to flood the same. While generally a considerable variation of level is permissible depending upon the design of the boiler and the rate of firing, this variation must be under control.

According to my invention I provide a level controlled valve which automatically admits the make-up water and which wastes or discharges the excess of water caused by the returned condensate. My valve is so constructed that the permissible variation between normal level and low level and between normal level and high level may be controlled by an adjustment of the valve mechanism.

I am aware that it is old to control the level of water in a boiler or other vessel automatically by level control and I do not make so broad a claim.

In a hot water heating plant it is not desirable to control the water contents of the system by level control since the only free level is at the top of the heating system, such for example as in the expansion tank. However, similar control of the contents of the system is just as desirable as in the case of a steam system: for example, if the system is started full of water when cold, the expansion of the water when heated makes it desirable to provide means for discharging the excess.

In a modified form of my invention I provide a pressure sensitive element subject to the head of water in the system for actuating the valve element to admit water as required and to waste or discharge any excess occurring upon undue expansion.

Another important function of the pressure controlled type of valve is to permit the blowing away of steam or unduly hot water in the boiler and the admission of colder water in case of excessive or improper firing which results in the formation of steam pressure. The valve element of the pressure controlled valve like that of the level controlled valve is capable of adjustment to secure the desired limits within which the level or contents may vary.

The arrangement for wasting or discharging any excess of liquid is a guarantee against any form of accidental flooding and is particularly effective to prevent flooding due to leakage past the inlet valve element. The adjustment of the device of my invention for different tolerances on the water level or head is simple and effective and permits of easy and accurate setting. The means whereby I secure the adjustment of the valve with respect to the actuating member is a selective key connection. I employ a symmetrical arrangement of multiple ports in the valve seat and in the valve, and by disposing the key connection at different positions of the valve relative to the operating shaft I am able to secure different relations between the ports of the valve and the valve seat for a given position of the actuating shaft. While in the preferred embodiment of my invention for simplicity of operation and ease of manufacture I provide a single keyway in the valve and a plurality of selectable keyways on the shaft, the key being shiftable, it is within my invention to provide a single keyway on the shaft and a plurality of keyways in the valve, and to make the key either stationary or shiftable. Also I do not wish to be confined strictly to a key and keyways.

Any equivalent means such as a pin and holes might equally well be employed.

While I have shown three symmetrical ports in valve and seat and thereby secure three possible adjustments, I could use four ports and get four adjustments, or by various combinations I may get other adjustments, but the above will illustrate the principle.

The details of the valve mechanism embody a number of improvements which will be apparent from the following detailed specification. Some of these improvements relate to a novel valve seat and movable valve element, interchangeable elements of the casing or housing to adapt the valve for different functions and novel features of assembly.

In addition I provide a novel form of removable strainer which has the strainer element secured to a removable plate in a simple but very effective manner.

The valve of my invention may be modified for general use without the overflow feature or it may be arranged to provide two controllable inlet passages for increasing the capacity of the valve.

Now in order to acquaint those skilled in the art how to construct and operate a device embodying my invention I shall describe in connection with the accompanying drawings a specific embodiment of the invention. In the drawings:

Fig. 18 is a front elevation of my improved valve as modified to provide a dual inlet;

Fig. 19 is a vertical cross section similar to the section shown in Fig. 3 of the form shown in Fig. 18;

Fig. 20 is a diagram of a steam heating system with my improved valve applied to the boiler;

Fig. 21 is a diagram of a hot water heating system employing a modified form of my valve wherein the head of water in the system controls the operation of the valve;

Fig. 22 is a medial vertical section through the modified form of valve shown in the diagram of Fig. 21; and Fig. 23 is a cross section taken on the line 23—23 looking in the direction of the arrows.

Figure 1:
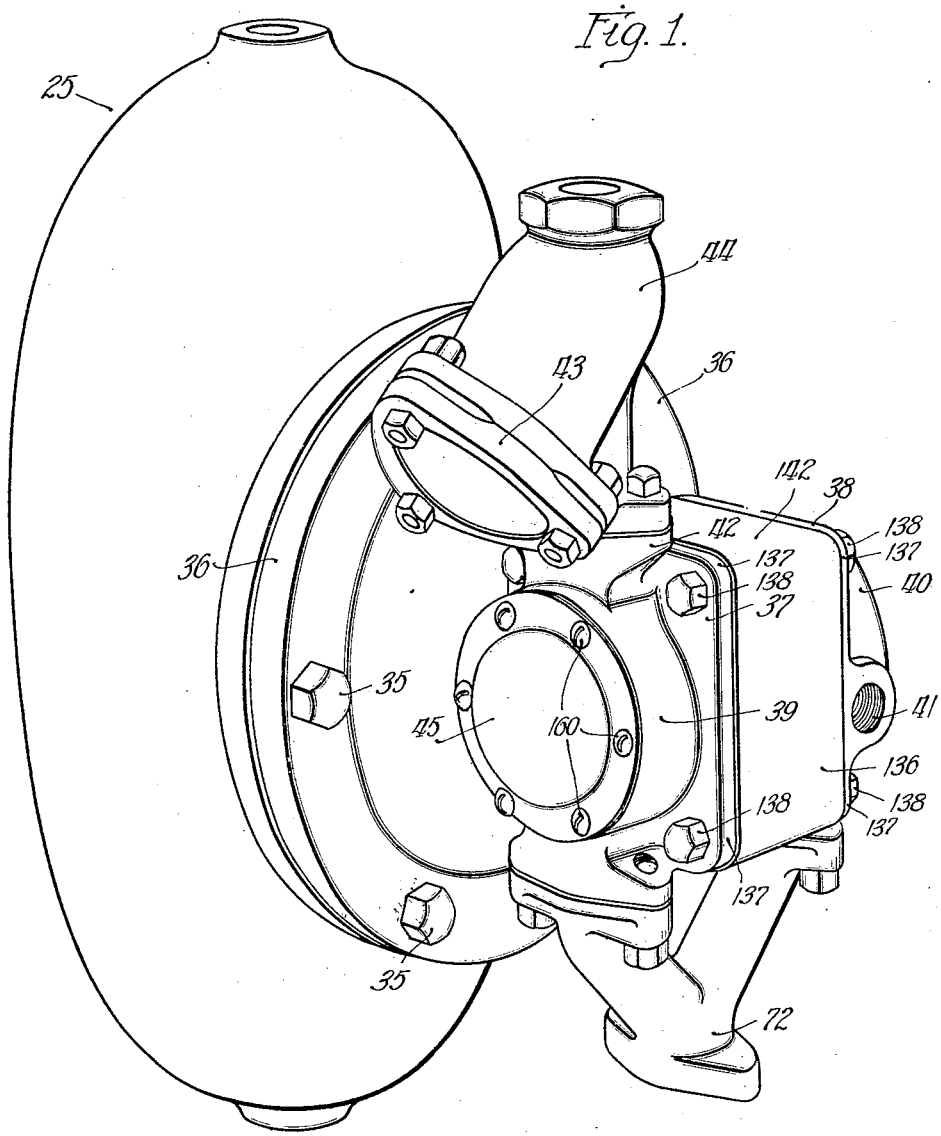
Fig. 1 is an isometric view of my improved valve and float housing with strainer in the inlet.

Referring now to the drawings, and more particularly to Figs. 1 to 17 inclusive, and Fig. 20 in which like reference numerals designate similar parts, the reference character 25 designates the float chamber of my improved valve structure. The float chamber is connected by pipes 26 and 27 to a boiler 28 of the heating system illustrated by the radiator 29. The float chamber 25 is somewhat oval in shape and contains within it a float 31 of any usual or well known construction. An arm 32 connects the float member to the valve operating shaft 33 through a suitable connecting member 34 the hub of which is broached to provide internal splines meshing with the splines formed upon the central enlarged part of the operating shaft 33. The float housing is provided with a flanged opening at one side to which is fastened by means of bolts 35 the flanged valve frame 36. The valve frame 36 has a central rectangular box-like portion 136, the inside of which communicates through the flared portion of the frame with the float chamber 25 to give the swinging float arm 32 freedom for movement with the float. The box-like portion 136 has a circular transverse bore through the side walls thereof, said bore being closed at its ends by circular bearing plates 50 and 51 which contain bearing bushings 48 and 49, pressed into bores in the plates. The box portion 136 has a machined circular gasket seat about each end of the transverse bore, and the plates 50 and 51 have circular machined flanges 144 for cooperating with the gasket seats on the box portion 136 on one side and on the other side with corresponding circular gasket seats formed on the inner faces of the valve housings 37 and 38 (see Fig. 3). The valve housings 37 and 38 are generally rectangular in outline corresponding to the outline of the box member 136 for providing four bolting ears 137 through which cap-screws 138 may be passed outside the periphery of the circular bearing plates 50 and 51 and threaded into interior lugs or bosses 141 formed on the box portions 136 (see Fig. 2). The bearing plates 50 and 51 have cylindrical piloting shoulders on each side cooperating with the circular bore through the box portion 136 and with the edges of circular recesses formed in the inner sides of the valve housings 37 and 38. By this means the parts may be readily assembled with plain cylindrical gaskets and a tight fit easily secured. The joints are covered by an ornamental sheet metal cover 142 held by machine screws 143. The valve housings 37 and 38 may be made identical, and they contain passages 144′ the outer ends of which are provided with bolting flanges for making connection with inlet and outlet fittings. In Fig. 3 the valve housings 37 and 38 are shown as being made on different patterns, but in Fig. 19 they are shown as made on the same pattern, and if the same pattern is desired on each side of Fig. 3 it may be so employed. The inlet passageway 144′ shown in Fig. 3 communicates with the strainer member 44 which has a bolting flange cooperating with the flange 42 and which has an inlet opening 146 that is adapted to communicate with a water supply source under pressure such as, for example, the city water mains. Such pipe is shown in Fig. 20 at 147. The strainer member 44 embodies certain features of novelty. The strainer body 44 has a cylindrical passageway within which lies the cylindrical strainer 47 mounted on a mounting plate 43 which is clamped by means of three bolts and corresponding clamping lugs to the housing body 44. At its upper end adjacent the inlet opening 146 the strainer cylinder 47 fits relatively closely in a cylindrical constricted portion 149 so that the incoming liquid entering through the passageway 146 is directed into the interior of the strainer 47 and thence, passing through the interstices of the cylindrical strainer 47, passes laterally through the sides of the same and then down to the inlet passageway 144′ of the valve housing 37. The mounting plate 43 for the strainer cylinder 47 has a recess therein with undercut edges as indicated at 150. This recess is cylindrical in contour to receive the end of the strainer cylinder 47. The lower end of the strainer cylinder 47 where it lies within the recess is expanded radially so as to secure a dovetailed connection with the mounting plate 43. This expansion might be secured by spinning the lower end of the strainer member into the dovetailed recess, but I have provided a simpler and better way of doing this by employing a Welch plug 151. The end of the strainer cylinder 47 is introduced into the dovetailed recess; then the Welch plug is dropped into the recess inside of the strainer cylinder 47 and is expanded by being flattened out, as shown in Fig. 3. It might be explained that a Welch plug is a plug which is circular in outline, but the body of the plug does not lie in a flat plane. It may be, for example, cylindrical. Then when the body of the plug is flattened out the outline becomes elliptical and in so expanding it to the elliptical form the edges of the strainer cylinder 47 are projected into the undercut parts of the recess, firmly locking the strainer cylinder 47 to the mounting member 43 and locking the same in place. The bottom of the recess is provided with a slight clearance to assist in this flattening out of the plug 151.

Figure 12:
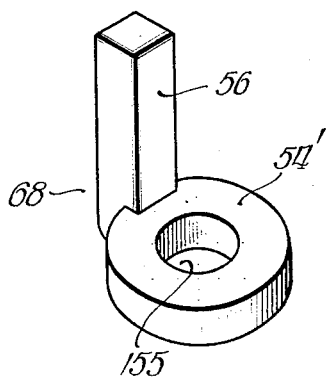
Fig. 12 is an isometric view of the adjustable key which connects the valve to the shaft and by its position controls the adjustment of the valve.
Figure 13:
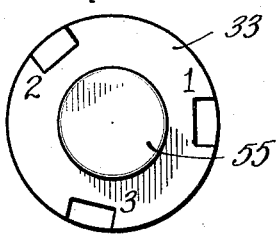
Fig. 13 is an end elevation of the inlet valve end of the valve operating shaft showing the three keyways corresponding to the three adjustments of the inlet valve.
Figure 14:
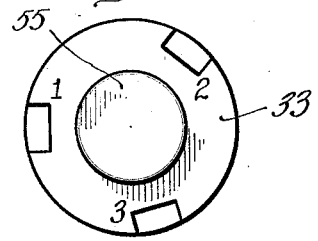
Fig. 14 is an end elevation of the outlet end of the shaft.

The valve housing members 37 and 38 provide bearings at 152 and 153 respectively for the outer ends of the operating shaft 33. The ends of the shaft project beyond the side walls of the valve housings to make a keyed connection with the rotary valve members 57 and 65. The outer walls of the housings 37 and 38 have recesses formed therein for receiving facings or seats 53 and 64 made of Monel metal. These valve facings 53 and 64 are pressed into the corresponding recesses to make fluid tight joints. The valve member 53, which, as shown in Fig. 3, is the inlet valve, contains three ports 54 symetrically arranged about the axis of the shaft 33. These ports 54 are formed in raised portions 154 of the body of the valve face 53 so as to limit the bearing surface between the valve seats and the cooperating valve members 57 and 65. The faces of the valve members 57 and 65 are flat and the raised parts of the valve face 53 are also flat to secure a tight fit between them. It will be observed that in the form of device herein shown there are three ports, and hence the raised part 154 has three symmetrically disposed arms which provide a stable support for the flat faces of the rotary valves. The valve members 57 and 65 have hollow hub members, as shown in detail in Figs. 6 and 7, containing keyways such as 59 adapted to receive the key members 68 as shown in Fig. 12, comprising a ring-like portion 54′ and an integral key member 56, said collar and key being preferably formed as a stamping of sheet metal. The ports 54 in the valve seat are disposed 120° apart, that is, equally spaced about the common center. The ports 60 in the valve members 57 and 65 are also equally spaced.

Figure 17:
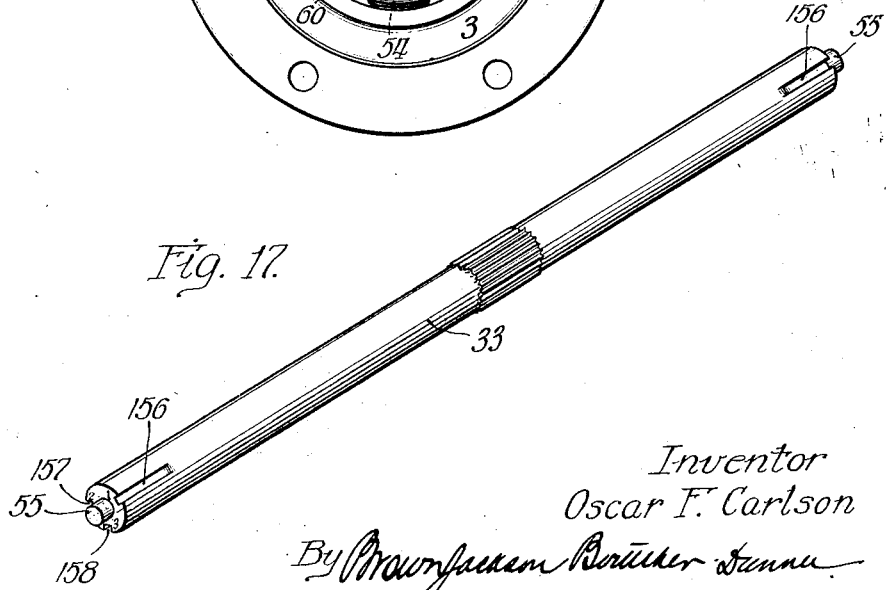
Fig. 17 is an isometric view of the valve operating shaft.

The outer ends of the shaft 33 have projections 55 of reduced diameter long enough to seat in the bores 155 of the collar 54' of the key members 56, and the ends of the shaft are provided with three keyways 156, 157 and 158, the keyways on one end being in alinement with the keyways on the other, and similarly numbered as indicated on Fig. 17 so that no mistake will be made in identifying a particular keyway 156, 157 or 158 at each end of the shaft since, as will be explained later, the key members 68 are adapted to be inserted in alinement with each other and for each adjustment of the valve device. These keyways are numbered on the ends of the shaft as 1, 2 and 3. The keyways 1 on opposite ends of the shaft are in alinement. The keyways 2 and 3 on opposite ends are not in alinement because they are not equi-angularly spaced as will now be explained, and both ends of the shaft are moved in unison. The keyways 1, 2 and 3 are not equi-angularly spaced about the axis of the shaft. The keyway 2 is displaced in the present instance 126° from the keyway 1, and the keyway 3 is displaced 126° from the keyway 2 and only 108° from the keyway 1. The purpose of this variation in angular position of the keyways is to secure an adjustment of the position of the ports of the valve with respect to the ports of the seat for a given position of the operating shaft 33, as will be described more in detail. The key members 68 with their integral collars 54' and keys 56 are adapted to be removed from the projections 55 on the ends of the shaft to make an adjustment of the valve with respect to the valve seat, but such key members 68 have only a single position with respect to the valve members 57 and 65. As a matter of fact the keys 56 might be permanently disposed within the keyways 59 in the valve members 57 and 65, but there would be danger of making an improper adjustment of the two valves 57 and 65 if the key were set permanently in the valve members. Obviously instead of having a plurality of positions in the shaft 33, there might be a plurality of positions, that is keyways, in the valve members 57 and 65 instead, but it would be inadvisable to place the index numerals 1, 2 and 3 on the face of the valve members since that would spoil the seating, and such index numerals can readily be put on the ends of the shaft, as shown in Fig. 17, since the end of the shaft is not required to make a tight fit with anything. By thus disposing the index numerals on the ends of the shaft and having the key member 68 adjustable, the operator is able to place the key member in the desired position with the index number in plain sight, and after having done so, he can make no mistake in applying the valve members 57 and 65 since they will fit the only one position. There is, therefore, a marked practical advantage in the structure which I have shown.

It will be apparent that the valve seat might be depressed within the body of the valve housings 37 and 38, but I prefer to have these valve seats exposed and in plain sight on the flat outside portions of said valve housings. Cup-shaped sheet metal cover members 45 and 46 having suitable bolting flanges, are secured over the valves and valve seats by the machine screws 160 shown in Fig. 1, the gasket being interposed to secure a tight joint at this place. Compression springs 61 and 69 embracing the hubs or bosses such as 58, shown in Figs. 6 and 7, extend outwardly to bear against the inside of the cap members 45 and 46 through the intermediary of pointed spring followers or caps 62 and 70 to hold said springs 61 and 69 under compression for seating the valve members 57 and 65 upon their respective valve seats. The valve housings 37 and 38 have flanged openings at 161 and 162, as shown in Fig. 3, and a Y-shaped manifold 72 is connected to the flanges thereof. The valve 57 controls the admission of water from the inlet pipe 147 through the discharge passageway 71, flanged opening 161, manifold 72 and feed pipe 163 (see Fig. 20) to the boiler 28. The valve member 65 controls the discharge of water from the boiler through the feed pipe 163, manifold 72, flanged opening 162, discharge passageway 144' through the valve and to the overflow or discharge pipe 164, shown in Fig. 20.

Figure 2:
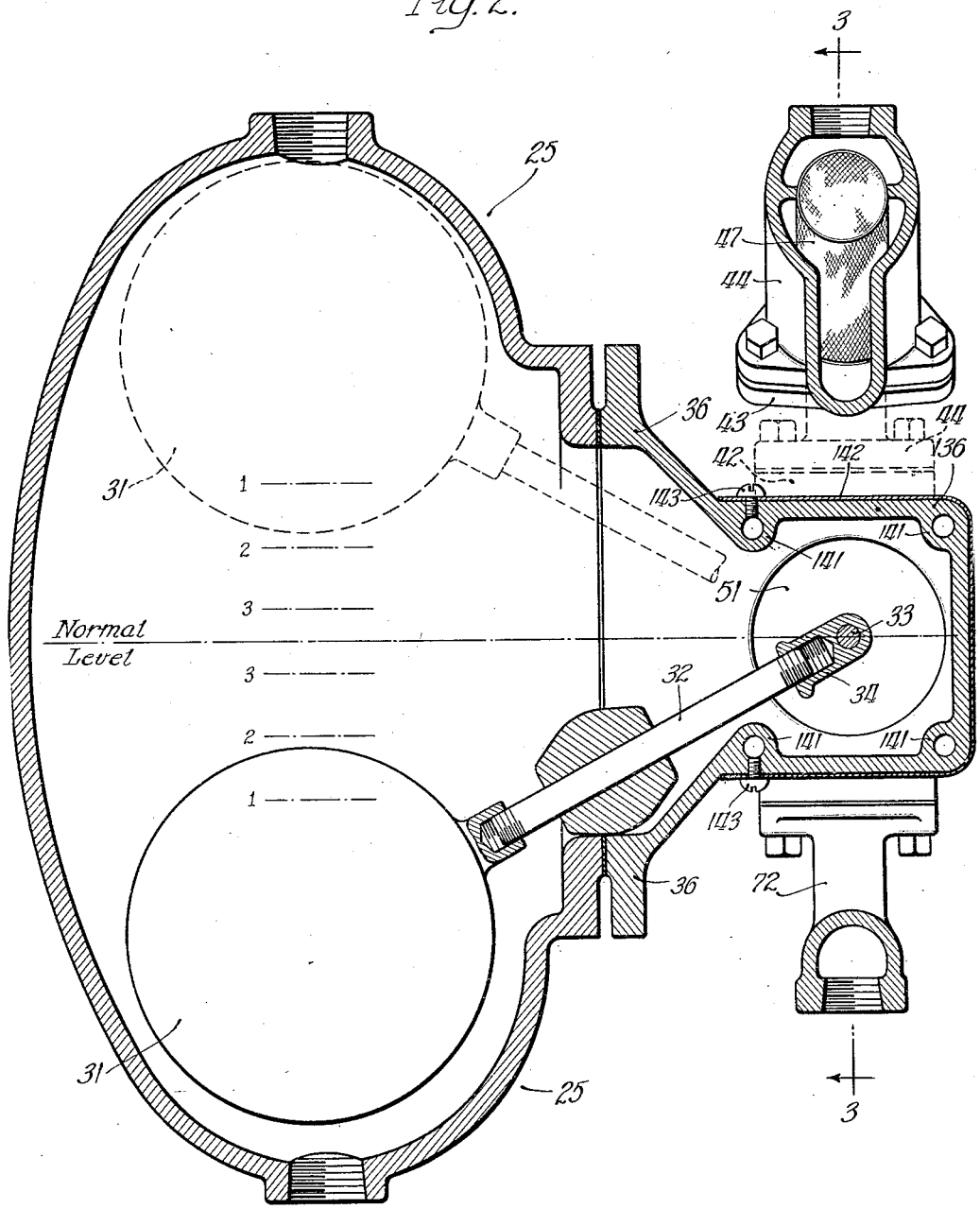
Fig. 2 is a medial vertical section therethrough along the line 2—2 of Fig. 3.
Figure 3:
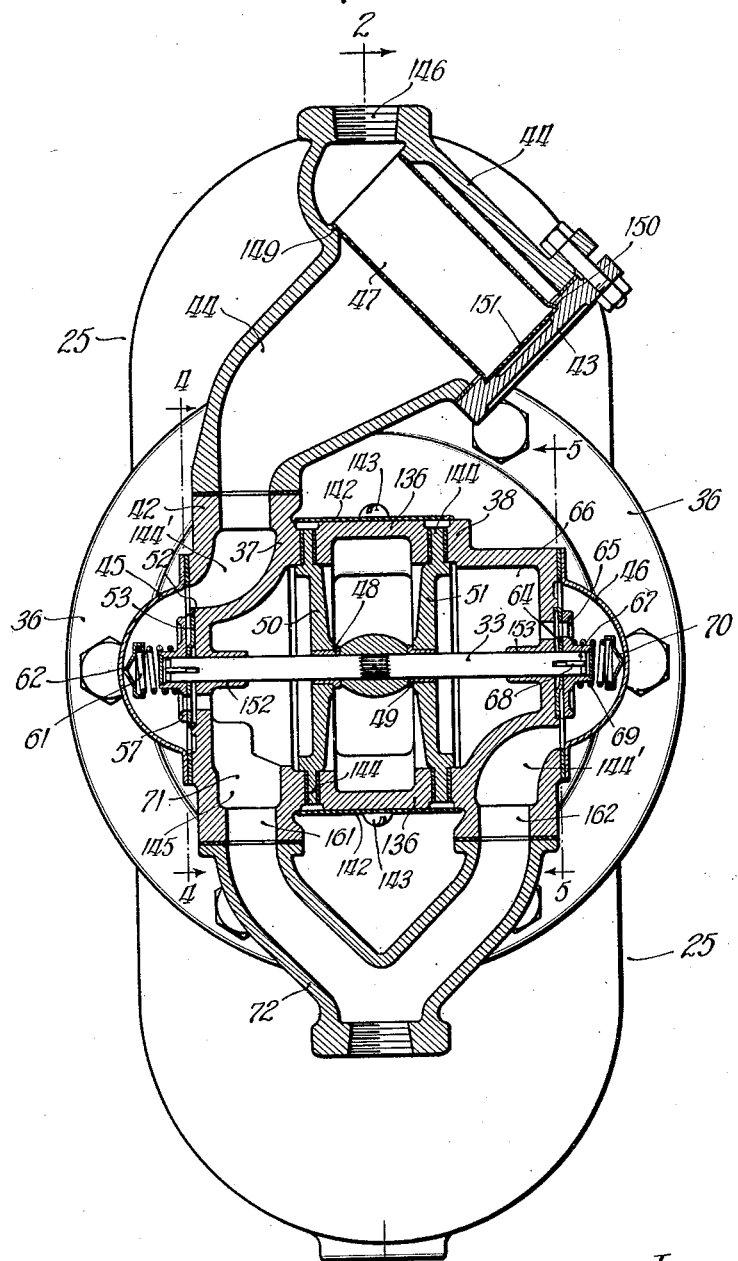
Fig. 3 is a vertical cross section of my improved valve structure along the line 3—3 of Fig. 2 looking in the direction of the arrow, showing also the strainer in section.
Figure 15:
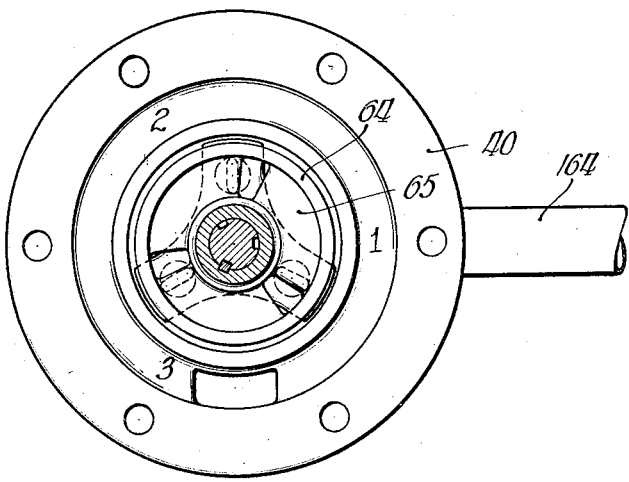
Fig. 15 is a view similar to Fig. 5 of the overflow valve in its third position of adjustment.
Figure 16:
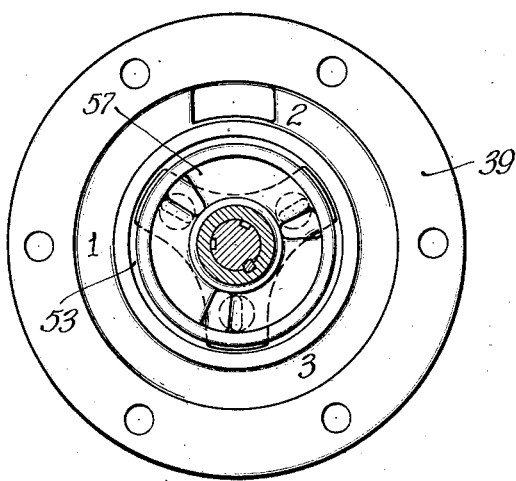
Fig. 16 is a view similar to Fig. 4 of the inlet valve showing it in its third position.

Referring now to Fig. 2, it will be observed that I have shown in broken lines the main level through the center of the controlling valve of my invention. Above it are positions 3, 2 and 1 in the order of their remoteness from the center line, and likewise their indicated levels 3, 2 and 1 below the center line in the order of their remoteness therefrom. By suitably setting the inlet and discharge valves 57 and 65 simultaneously I am able, by adjustment corresponding to keyway 1, to hold the level between the extreme levels indicated by lines 1—1 on opposite sides of the center line in Fig. 2. By adjustment of the key member 68 and corresponding valve adjustment of the valve member corresponding to keyway 2, I am able to hold the level between the level lines 2—2, and similarly by placing the key member 68 in the keyways 3—3 on the shaft the valves are adjusted to hold the level between the lines 3—3 on Fig. 2. The manner in which this is accomplished will be more clear by reference to Figs. 4, 5–15, 16 and 10, 11. By putting the key member 68 in keyways marked 1 on each end of the shaft 33 and then applying the corresponding valves 57 and 65, the position shown in Figs. 15, 16 of said valves with respect to their seats will be secured. Since the ports in the valve and in the seat are symmetrically disposed, that is, in this case 120° apart center to center the positions of the parts produced in Figs. 15, 16 is such that on any slight decrease in level in the boiler corresponding to line 3 below the center line of Fig. 2 the inlet valve ports between valve 57 and seat 53 will provide an opening for the admission of water under pressure from the inlet connection 147. This opening of the valve results in raising of the water level within the boiler until the float 31 rises to a position which closes off the valve opening.

If now due to the return of the condensate from the radiator system 29 the level in the boiler rises above the normal level line to the line 3 shown above the normal level line in Fig. 2 the discharge valve 65 begins to open and will discharge any water in excess of that above the level line 3 of Fig. 2.

If it is desired to permit a greater variation of level such, for example, as that between the lines 2—2 of Fig. 2, the key member 68 at each end is placed in the keyway numbered 2 and the valves are then applied. By this adjustment with the float 31 at normal level the inlet and discharge valves 57 and 65 will be disposed in the position shown in Figs. 10 and 11. In this case the lap of the valve with respect to the seat is greater, as will be apparent in Figs. 10, 11, and a greater movement of the float downwardly is required to open the inlet valve, and a greater movement of the valve upwardly is required to open the discharge valve. By this setting, therefore, when the level drops to the lower line 2 the inlet valve will be open, and if through return of condensate or through leakage or for any other cause the level rises above the upper line 2 on Fig. 2, the discharge valve will be opened and the excess discharged through the discharge connection 164.

Figure 4:
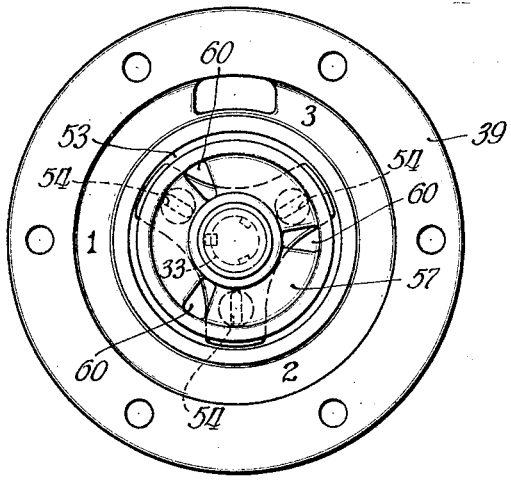
Fig. 4 is a front elevation of the inlet valve and valve seat with cover removed as if viewed on the line 4—4 of Fig. 3 looking in the direction of the arrows.
Figure 5:
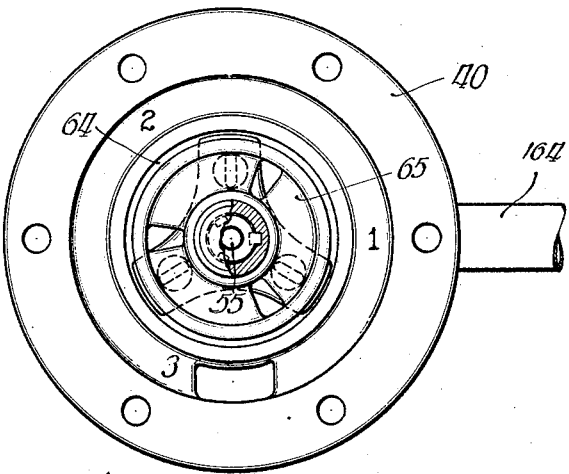
Fig. 5 is a similar view of the overflow valve taken on the line 5—5 of Fig. 3 looking in the direction of the arrows.
Figure 6:
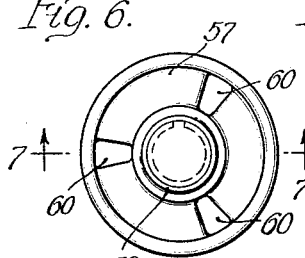
Fig. 6 is a front elevation of the movable valve element showing its three inlet or outlet ports.
Figure 7:
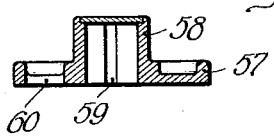
Fig. 7 is a cross section taken on the line 7—7 of Fig. 6 looking in the direction of the arrows.
Figure 8:
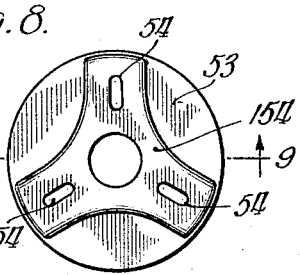
Fig. 8 is a front elevation of the cooperating valve seat showing its three ports.
Figure 9:
Fig. 9 is a cross section of the valve seat member taken on the line 9—9 of Fig. 8 looking in the direction of the arrows.
Figure 10:
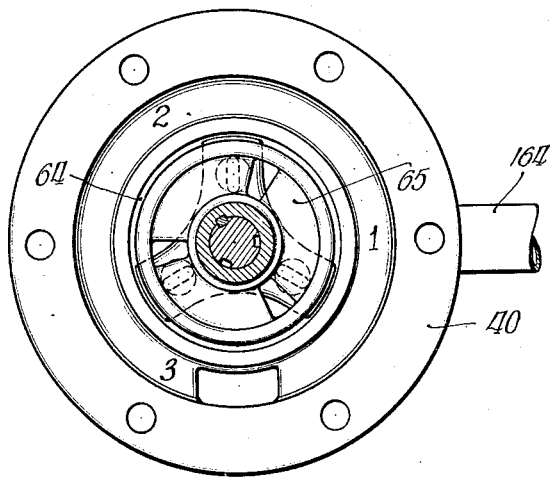
Fig. 10 is a view similar to Fig. 5 showing the outlet valve in another position of adjustment for a given tolerance of lines corresponding to the adjustment of the inlet valve in Fig. 11.
Figure 11:
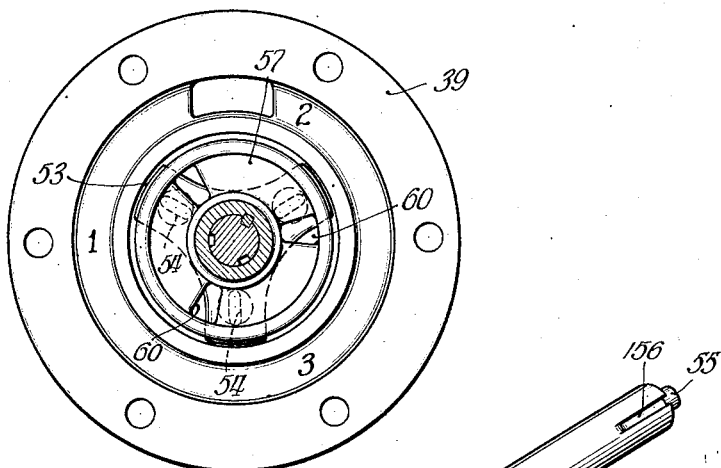
Fig. 11 is a view similar to Fig. 4 showing the inlet valve structure in a position of adjustment different from that shown in Fig. 4.

In Figs. 4 and 5 the position of the valve member with respect to its seat is indicated for adjustment secured by inserting the key member 68 into the keyway marked with index 1 on the ends of the shaft 33, and it will be observed that the spacing of the valve ports angularly with respect to the seat ports is greater so that a movement of the float 31 from the normal level down to the line 1 of Fig. 2 is required to open the inlet valve, and a movement of the float 31 to the upper level indicated by reference numeral 1 on Fig. 2 will be required before the discharge valve will be open. It is to be observed that the angular position of the valve member with respect to the valve seat member is measured between the edges of the cooperating ports, and since these ports have some angular width the first 6° increments between keyways 3, 2 and 1 are measured from the advancing edge of one port with respect to the nearest edge of the coacting port in each case.

It is to be observed that in adjusting the position of the valves with respect to their seats they are moved not through the 6° increments but through 126. Due to the fact that the valve and the seat are symmetrical the actual adjustment becomes a 6° adjustment. Obviously I do not intend to be limited to a 6° adjustment, as any suitable amount may be adopted and used. Where the number of ports is greater than three, obviously the angular change will be different. It would be practically impossible to make a 6° adjustment with a key of sufficient strength to secure these parts together, and a series of splines is not desirable because of the likelihood of confusion, which would be caused if multiple splines were utilized.

The outlet connection 164 is a pipe threaded into a socket such as 41 shown in Fig. 1, which comprises a drilled and threaded hole extending into the chamber 66 shown in Fig. 3.

In Figs. 18 and 19 I have shown the manner in which a valve may be employed as a straight level control valve of greater capacity by making the valve chamber 165 and its associated valve 65 operate as an inlet valve.

It is to be observed that in case of the structure shown in Fig. 3 and in case of the structure shown in Fig. 19 the valves are so arranged with respect to the superior pressure upon them that they are held to their seats thereby, instead of permitting the pressure to operate against the valves to throw them off their seats. The raised projection 154 on the valve faces assist in reducing the contacting areas, and hence the friction between these parts. In the structure shown in Figs. 18 and 19 where the valves are used as a straight metal control inlet valve, both the valve 57 and the valve 65 shown in this modification are inlet valves operating simultaneously, their inlet passageways being connected through a manifold connection 80 interposed between the screen housing 44 and the valve chambers. In this case the manifold 72 which connects the interior chambers of the valve housings is a discharge manifold. It will thus be seen that my valve may be employed for a variety of purposes such as feed water control, air eliminators, steam traps, steam reducing valves and the like.

In the particular device shown in Figs. 1 to 17 the levels shown on Fig. 2 are 5, 3 and 1 inches apart respectively. Obviously the level variations may be differently arranged, if so desired. In the use of the device shown in Figs. 1 to 17 on a boiler the float chamber 25 is connected as by connections 26 and 27 with the top and bottom portions of the boiler 28 respectively, so that the line indicated as the normal level line in Fig. 2 lies on a line of the desired normal level in the boiler. If in the generation of steam, make-up water is required to hold the level within the desired tolerances, the admission valve is open to supply the make-up water. If thereafter through the return of condensate from the steam mains and radiators the level tends to rise above the permissible tolerance, the discharge valve will open and waste or discharge sufficient water to hold the level within the range permitted. As previously explained, this discharge valve is a safeguard against any possible flooding due to leakage of the inlet valve. Likewise the inlet valve is a guarantee against the wasting of too much water by a leaky discharge valve.

By a modification of the valve of my invention it is possible to apply the same to a hot water heating system. In such a system the only level which is maintained is that within the expansion tank 103, as shown in Fig. 21, or in the riser pipe leading up to the same. In that case the hot water heating boiler 102 has a circulating system connected thereto including suitable pipes and the radiator 101. A modified form of my valve indicated at 100 in Fig. 21 is connected between an inlet pipe 140 which leads to a source of water under pressure and the feed pipe 135 connected to the boiler in this case through the return main. An overflow or discharge pipe 108 is also provided for wasting or discharging any excess due to expansion or leakage of the inlet valve. The modified valve consists of a cylindrically shaped casing 105 that is provided with an inlet port 106, the outlet or supply port 107 and an overflow port 108. A valve operating shaft 109 is disposed in suitable bearings in the casing 106 in the manner indicated in Fig. 23. A cup-shaped casing 110 encloses one end of the shaft 109 and also the valve structure forming the inlet port proper. A cup-shaped closure member 111 encloses the other end of the valve operating shaft and forms the overflow port. The valve structure of the inlet valve is essentially the same as that shown and described with respect to my improved valve shown in Figs. 1 to 16, inclusive, and consists essentially of the valve members 113 and 114, the valve member 114 being suitably placed in position by the ring shaped key 115, the whole assembly being held in place by the spiral spring 116 provided with a cap 117 abutting against the inside of the cup-shaped cover 110. The overflow valve is similarly constructed. The shaft 109 is provided with three keyways at each end in the same manner as before and there is the same cooperative relation between the inlet and overflow valves as has been explained hereinbefore. The shaft 109 is provided with a pinion 120 that cooperates with the rack 121 on the shaft 122.

The shaft 122 is centrally located and suitably attached to one end of a bellows or sylphon 123 supported by the inwardly-extending flange 124 of the casing 105. At its lower end, the shaft 122 works in a suitable fluid tight bearing 125 so as to provide for longitudinal movement. A spiral spring 126 is seated within the bellows 123. A cylindrically shaped casing 127 is suitably secured to the cylindrically shaped casing 105 and contains a suitable seat 128 on a shaft 129 that is threaded through the end wall of the cylindrical casing 127. A lock nut 130 is provided for locking the adjustment of the shaft 129. The bellows 123 is for the purpose of protecting the spring from oxidization so as not to alter its tension. It will be seen that the tension of this spring can be regulated by operating the screw threaded shaft 129 and locking it in position. The shaft 129 may be calibrated if desired against predetermined pressure. It will be seen that a connection 135 is made from the valve to the heating system and that there is a continuous pressure through the pipe 135 on the end of the sylphon 123 acting against the spring 126. In accordance with the spring tension, the shaft 122 is shifted to a predetermined position until the pressure of the water is balanced by the pressure exerted by the spring. The rack 121 by this operation rotates pinion 120 and consequently the valve shaft 109 which brings about the inter-related operation of the inlet and overflow valve. A decrease in pressure by a pre-determined amount will bring about sufficient rotation of the valve shaft 109 so that water will be admitted from the supply pipe 140 to the inlet port 106 and thence through the inlet valve to the boiler. As the pressure increases, the valve shaft 109 through the mechanism described is rotated in the opposite direction until the inlet valve is closed. When the pressure of the water becomes too great, the valve shaft 109 is rotated so that the overflow valve is opened and water is permitted to flow into the drain. This increased water pressure may be brought about by the expansion of the water upon heating. The valve thus automatically functions to maintain the desired degree of water pressure and the proper amount of water in the system automatically admitting more water when more is needed to bring it up to standard and draining water when there is too much in the system. The three key positions at each end of the valve operating shaft are for exactly the same purpose as before described, that is, by variously positioning the valve members with respect to each other, it is possible to maintain the pressure within the limits desired. In the first instance, quite a wide range of pressure is permitted, in the second instance the range is decreased to some extent, while in the third instance the pressure will be maintained substantially constant at all times. This will be true irrespective of the temperature of the water or its increase in volume by heating.

While I have described certain specific embodiments of my invention, it will be understood that I am aware that many changes, modifications and departures may be made without departing from the spirit and scope thereof and that I desire to protect by Letters Patent all such changes, modifications and departures as come within the scope of the appended claims.

I claim:

1. A heating system including a boiler, an inlet valve for admitting liquid to said boiler, an outlet valve for draining said boiler, and a common operating shaft connecting said valves the shaft being mounted for rocking movement on its axis and said valves being mounted upon the shaft for movement therewith.

2. A valve comprising a stationary valve member having a plurality of ports, a shaft extending through said member, a plurality of keyways at one end of said shaft, a rotatable valve member on said end of the shaft, and means including said keyways for positioning said valve about said shaft.

3. A valve comprising a stationary valve member having a plurality of ports, a shaft extending through said member, a plurality of keyways at one end of said shaft, a rotatable valve member on said end of the shaft, a keyway in said rotatable valve member, said key and keyways cooperating to rigidly position said rotatable valve member on said shaft.

4. A valve comprising a stationary valve member, a seat for supporting said member, a rotatable shaft extending through said member, a rotatable valve member positioned on said shaft adjacent said stationary valve member, means for adjusting the rotatable valve member about the shaft and for connecting it to the shaft for movement therewith, an enclosure for said valve members forming an inlet chamber on one side of said stationary valve member and an inlet connection to said chamber on one side of said rotatable valve member.

5. A valve comprising a stationary valve member having a plurality of ports, a shaft extending through said member, a plurality of keyways at one end of said shaft, a rotatable valve member on said end of the shaft, and a keyway in said rotatable valve member, said key and keyways cooperating to adjust the position of said rotatable valve member when mounted on said shaft.

6. A valve structure comprising two spaced apart stationary valve members, a valve supporting structure providing seats for each member, a shaft extending through said members, rotatable valve members adjustably mounted on said shaft adjacent said stationary valve members, enclosures for said valve members forming an inlet chamber adjacent one of said valves and an outlet chamber adjacent the other valve, an inlet connection extending to the rotatable valve member associated with the inlet chamber and an overflow connection extending to the rotatable valve member associated with the overflow chamber.

7. A valve structure comprising two spaced apart stationary valve members, a valve supporting structure providing seats for each member, a shaft extending through said members, rotatable valve members adjustably mounted on said shaft adjacent said stationary valve members, enclosures for said valve members forming an inlet chamber adjacent one of said valves and an outlet chamber adjacent the other valve, an inlet connection extending to the rotatable valve member associated with the inlet chamber, an overflow connection extending to the rotatable valve member associated with the overflow chamber and means for rotating said shaft in either direction.

8. A valve structure comprising two spaced apart stationary valve members, a valve supporting structure providing seats for each member, a shaft extending through said members, rotatable valve members adjustably mounted on said shaft adjacent said stationary valve members, enclosures for said valve members forming an inlet chamber adjacent one of said valves and an outlet chamber adjacent the other valve, an inlet connection extending to the rotatable valve member associated with the inlet chamber, an overflow connection extending to the rotatable valve member associated with the overflow chamber, means for rotating said shaft in one direction to open the valve associated with said inlet chamber.

9. A valve structure comprising two spaced apart stationary valve members, a valve supporting structure providing seats for each member, a shaft extending through said members, rotatable valve members adjustably mounted on said shaft adjacent said stationary valve members, enclosures for said valve members forming an inlet chamber adjacent one of said valves and an outlet chamber adjacent the other valve, an inlet connection extending to the rotatable valve member associated with the inlet chamber, an overflow connection extending to the rotatable valve member associated with the overflow chamber, means for rotating said shaft in one direction to open the valve associated with said inlet chamber and to close the valve associated with said overflow chamber simultaneously.

10. In combination, a rotary valve seat having multiple ports symmetrically arranged about a common center, a rotary valve having a like number of symmetrical concentric ports cooperating with the first named ports, a shaft for said valve, said shaft and valve having a connecting member for connecting them in a plurality of definite positions which for a given position of the shaft provide different relative positions between the ports in the seat and in the valve.

11. In combination, a rotary valve seat having a plurality of ports symmetrically arranged about a common center, a concentric rotary valve adapted to lap said ports, said valve having a like number of ports adapted to register with the first named ports, a shaft for said valve, said shaft having a plurality of keyways, and said valve having a single key cooperable therewith, said keyways being disposed at angular distances from each other different from the angular spacing of the ports of said valve to secure angular adjustment of the valve with respect to the seat.

12. In combination, a rotary valve seat having a plurality of ports spaced at equal angular distances about a common center, a rotary valve member having ports similarly spaced, a shaft member for said valve member, a single connecting element for said members having only a single connecting position with respect to one member and a plurality of connecting positions with respect to the other member, said plurality of connecting positions being disposed at angular distances from each other, different from the angular spacing of the ports of said valve, to receive angular adjustment of the valve with respect to the seat.

13. A valve structure comprising two spaced apart stationary valve members provided with ports, a rotatably mounted shaft, rotary valves controlling the ports of the stationary members and provided with ports disposed to be brought into and out of register with the ports of said stationary members in the movement of the valves, the shaft being provided with spaced key ways in each end, each of the valves being provided with a key way, and a key member cooperating with the key ways of the shaft and the valves for adjustably mounting the valves upon the ends of the shaft for movement therewith.

14. In combination a valve structure, a container, an inlet valve and an overflow valve therefor, a rockably mounted shaft, means for mounting the valves upon the shaft for movement therewith and for effecting selective and predetermined relative adjustment of the valves on the shaft, and means connected to the shaft between the valves and extending into the container and subject to the contents thereof for actuating the valves in unison.

15. In combination in a valve structure, a liquid receiving container having an inlet opening and an overflow opening, a rockably mounted shaft, valves controlling said openings and mounted upon the shaft for movement therewith, means for adjustably securing the valves to the shaft in selective and predetermined relation, and float means secured to the shaft between the valves and subject to variations in level of liquid in the container for operating the respective valves in accordance with such variations.

In witness whereof, I hereunto subscribe my name this 9th day of February, 1928.

OSCAR F. CARLSON.